United States Patent [19]

Nikolaus

[11] Patent Number: 4,856,366
[45] Date of Patent: Aug. 15, 1989

[54] CONNECTING ROD BEARING ASSEMBLY
[75] Inventor: John G. Nikolaus, New Berlin, Wis.
[73] Assignee: Vilter Manufacturing Company, Milwaukee, Wis.
[21] Appl. No.: 169,104
[22] Filed: Mar. 9, 1988

Related U.S. Application Data

[63] Continuation of Ser. No. 867,075, May 27, 1986, abandoned.

[51] Int. Cl.$^4$ .......................... F16C 3/14; F16C 33/10; G05G 1/00
[52] U.S. Cl. .................... 74/605; 74/579 E; 74/587; 384/291
[58] Field of Search ............... 74/579 E, 579 R, 587, 74/605; 384/288, 291, 294; 184/605; 123/196, 197 R, 197 AB

[56] References Cited

U.S. PATENT DOCUMENTS

| | | | |
|---|---|---|---|
| 692,982 | 2/1902 | Capewell | 384/291 |
| 1,117,256 | 11/1914 | Schwitzer | 74/605 X |
| 1,397,050 | 11/1921 | Holtorp | 74/605 |
| 1,863,809 | 6/1932 | Hopkins et al. | 74/579 E X |
| 2,131,170 | 9/1938 | Evans | 74/605 |
| 2,523,699 | 9/1950 | Holt et al. | 74/579 E |
| 2,631,905 | 3/1953 | Coppen | 384/291 |
| 2,673,767 | 3/1954 | Schoeppner | 384/291 |
| 3,069,926 | 12/1962 | Hoffman et al. | 74/605 X |
| 3,131,785 | 5/1964 | Blank | 74/587 X |
| 3,361,007 | 1/1968 | Belsanti et al. | 74/587 |
| 3,386,783 | 6/1968 | Scheufler | 384/291 |
| 3,449,028 | 6/1969 | DeHart | 384/288 X |
| 3,842,938 | 10/1974 | Barnes-Moss | 74/605 X |
| 4,105,267 | 8/1978 | Mori | 384/291 |
| 4,201,176 | 5/1980 | Lustgarten | 184/6.5 |
| 4,345,797 | 8/1982 | Ballheimer | 184/6.5 X |
| 4,567,815 | 2/1986 | Kocher | 384/291 X |

FOREIGN PATENT DOCUMENTS 24745  11/1907  United Kingdom ................. 74/587

Primary Examiner—Rodney M. Lindsey
Attorney, Agent, or Firm—James E. Nilles; Thomas F. Kirby

[57] ABSTRACT

A refrigeration gas compressor comprises a piston reciprocably movable to effect gas compression, a motor-driven rotatable crankshaft, and a connecting rod between a crank pin on the crankshaft, and a wrist pin on the piston. A crank pin receiving hole and a wrist pin receiving hole in opposite ends of the connecting rod are connected by an oil passage. The oil passage is connected to a groove in the upper side wall in the crank pin receiving hole. The crank pin has two lubricating oil supply ports at opposite sides of its outer surface through which lubricating oil is pumped. A bearing assembly comprising semi-circular upper and lower bearing sections is disposed around the crank pin. Each bearing section has a smooth inner surface. The upper bearing section has oil well recesses near, but spaced from, opposite ends of its inner surface which receive oil from the oil supply ports each time a port moves therepast. The upper bearing section also has two oil feed holes therethrough for supplying oil from the oil supply ports, each time a port moved therepast, directly to the groove in the side wall of the crank pin hole behind the upper bearing section. Each oil feed hole is located between and spaced from both an oil well recess and an end of the upper bearing section. The rotational upward compression stroke of the crank pin causes oil to be drawn toward a narrow end of the oil well recesses to effect high pressure hydrodynamic lubrication between the upper bearing section and the upper side of the crank pin.

3 Claims, 4 Drawing Sheets

CONNECTING ROD BEARING ASSEMBLY

This application is a continuation of application Ser. No. 867,075 filed May 27, 1986, now abandoned.

BACKGROUND OF THE INVENTION

1. Field of Use

This invention relates generally to a connecting rod in the drive connection between a crank shaft and a piston in a gas compressor or the like.

In particular, it relates to the construction of a two-piece bearing assembly employed in a crank pin receiving hole in the connecting rod.

2. Description of the Prior Art

U.S. Pat. No. 4,567,815, issued Feb. 4, 1986, to Erich J. Kocher for "Connecting Rod And Bearing Assembly Therefor" and assigned to the same assignee as the present invention, discloses a piston, crankshaft and connecting rod arrangement for a refrigeration gas compressor which is identical to that disclosed herein.

That patent discloses a connecting rod which comprises a wrist pin hole at one end and a cylindrical crank pin hole at its other end. The upper surface of the crank pin hole is provided with an oil receiving groove which communicates with an oil passage extending through the connecting rod to the wrist pin hole. The crank pin hole in the connecting rod is adapted to receive the crank pin and the connecting rod bearing assembly disposed therearound. The crank pin comprises a first oil passage which extends axially therethrough and a second oil passage which extends transversely through the crank pin and communicates with the first oil passage.

The connecting rod bearing assembly comprises two (upper and lower) semi-circular bearing sections. The upper bearing section has a smooth inner bearing surface with two wedge-shaped oil well recesses (i.e., of generally triangular cross-sectional configuration) formed therein at opposite ends thereof and has two oil feed holes extending through the oil well recess, one near each end of the oil well recess. The lower bearing section has an inner bearing surface with an oil-receiving groove formed in and circumferentially extending along its inner surface between opposite ends of the lower bearing section. The ends of the groove in the lower bearing section communicate with the oil well recesses in the upper bearing section and continuously supply oil to the oil well recesses and oil feed holes therein.

During operation, the upper bearing section and the confronting crank pin surface are subjected to heavy loads on each upward compression stroke of the crank pin. However, the overall construction of the connecting rod, crank pin and connecting rod bearing assembly avoids wear on the crank pin and bearing assembly by providing hydrodynamic lubrication of the bearing assembly. Lubricating oil is fed under pressure through the first and second passages in the crank pin and is expelled from opposite ends of the second passage. Depending on the position of the crank pin relative to the bearing assembly, oil flows directly to the two oil well recesses in the upper section or to the groove in the lower bearing section and then to the oil well recesses. From these recesses oil flows to the groove in the lower section and through the two oil feed holes in the upper bearing section. Oil flows through the two oil feed holes to the oil receiving groove in the connecting rod and from thence through the associated oil passage to the wrist pin hole.

On the compression stroke oil is drawn from one of the two oil well recesses in the upper bearing section hydrodynamically between the smooth inside load-bearing surface of the upper bearing section and the confronting surface of the crank pin. Oil also is forced from the groove in the lower bearing section between the two smooth inside load-bearing surfaces of the lower bearing section and the crank pin.

The oil well recesses at each end of the upper bearing section are continuously supplied with oil from the groove in the lower bearing section which is in communication at all times with the oil supply ports of the transverse oil passage in the crank pin.

While the bearing assembly disclosed and claimed in U.S. Pat. No. 4,567,815 has been used successfully and has excellent lubrication characteristics, it permits a relatively large amount of lubricating oil to be pumped into and through the bearing assembly and to spray from the bearings to other internal parts. This excessive quantity of lubricating oil needs to be pumped, cooled in the oil coolers and recovered and this detracts from overall system efficiency. The large amount of oil spray from the bearings also increases the possibility of oil pumping past the piston rings into the compression chamber.

SUMMARY OF THE PRESENT INVENTION

In accordance with the present invention, there is provided an improved bearing assembly which is especially well-adapted for use in apparatus such as a refrigeration compressor or the like and which reduces the quantity of lubricating oil required for proper lubrication and increases the overall system efficiency of the compressor and system in which it is used.

The improved bearing assembly is used in a compressor wherein the connecting rod comprises a wrist pin hole at one end and a cylindrical crank pin hole at its other end. The upper surface of the crank pin hole is provided with an oil receiving groove which communicates with an oil passage extending through the connecting rod to the wrist pin hole. The crank pin hole in the connecting rod is adapted to receive the crank pin and the connecting rod bearing assembly disposed therearound. The crank pin comprises a first oil passage which extends axially therethrough and a second oil passage which extends transversely through the crank pin and communicates with the first oil passage. The second oil passage provides two oil supply ports on opposite sides of the crank pin.

The connecting rod bearing assembly in accordance with the invention comprises two (upper and lower) semi-circular bearing sections. The upper bearing section has a smooth semi-cylindrical inner bearing surface with two oil well recesses formed therein near, but spaced from, opposite ends thereof and has two oil feed holes extending through the upper bearing section. Each oil well recess, which extends inwardly from the semi-cylindrical inner bearing surface of the upper bearing section, has a cross-sectional configuration, taken lengthwise of the upper bearing section, which is arcuate or curved. More specifically, each oil well recess is located between the midpoint and one end of the upper bearing section. Each oil feed hole is located between an oil well recess and an end of the bearing section and is spaced from both the oil well recess and the said end of the bearing section. The lower bearing section has a smooth inner bearing surface with no interruptions or groove therein.

During operation, the upper bearing section and the confronting crank pin surface are subjected to heavy loads on each upward compression stroke of the crank pin. However, the overall construction of the connecting rod, crank pin and connecting rod bearing assembly avoids wear on the crank pin and bearing assembly by providing hydrodynamic lubrication of the bearing assembly. Lubricating oil is fed under pressure through the first and second passages in the crank pin and is expelled from the oil supply ports at opposite ends of the second passage. Depending on the position of the crankshaft and crank pin relative to the bearing assembly, oil is pumped and intermittently flows directly to and fills the two oil well recesses in the upper section (twice per revolution for each oil well recess), or through the two oil feed holes in the upper bearing section (twice per revolution for each oil feed hole). Oil flows through the two oil feed holes to the oil receiving groove in the connecting rod and from thence through the associated oil passage to the wrist pin hole.

On the compression stroke oil is drawn from both oil well recesses in the upper bearing section hydrodynamically, as hereinafter explained, between the smooth inside surface of the upper bearing section and the confronting surface of the crank pin. One oil well recess (depending on direction of rotation) is the principal supplier of oil to the major load bearing zone between the crank pin and the upper bearing section.

Unlike connecting rod and bearing assemblies used in four-cycle high-temperature IC engines, the connecting rod and the bearing assembly therefor in accordance with the invention is well-adapted for use in a relatively cool two-cycle refrigerator compressor, wherein one (the "upper") bearing section is more frequently subjected to heavy loads on each compression stroke, and the overall construction avoids wear and permits hydrodynamic lubrication using more viscous lubricating oil. The ungrooved inner bearing surfaces of the upper and lower bearing sections utilize substantially the full crank pin surface thereby improving its load bearing capacity. Furthermore, the wells on the one (upper) section enable use and flow of more viscous lubricating oil at higher pressure for hydrodynamic lubrication. An uninterrupted bearing surface can support a greater load than a grooved bearing surface of comparable size when hydrodynamic lubrication is achieved and, under this condition, the bearing surface and mating crank pin surface are actually separated by an oil film and no wear occurs.

The bearing construction and arrangement is such that positive lubrication is obtained with the crankshaft operating in either direction of rotation. Symmetry is obtained by having oil well recesses near each end of the upper bearing section which are intermittently or periodically supplied with oil from the oil supply ports at the ends of the transverse oil passage in the crank pin.

A bearing assembly in accordance with the present invention offers advantages over the prior art. Elimination of a groove in the lower bearing section so that its surface is smooth, redesign of the oil well recesses, separation of oil well recesses in the upper bearing section from the oil feed holes therethrough, and location of oil well recesses away from the ends of the upper bearing section ensure that oil is supplied only intermittently (twice during each cycle of rotation) to each oil well recess and to each of the oil feed holes, rather than continuously as in U.S. Pat. No. 4,567,815. The advantages are that less oil is supplied to the bearing assembly and less leakage occurs, less oil needs to be recovered and reprocessed (filtered and cooled), bearing assembly temperatures still remain within acceptable cooling parameters, and overall efficiency of the compressor and system is retained or increased.

Other objects and advantages of the present invention will hereinafter appear.

DRAWINGS

DESCRIPTION OF A PREFERRED EMBODIMENT

Figures 1, 2, 3:
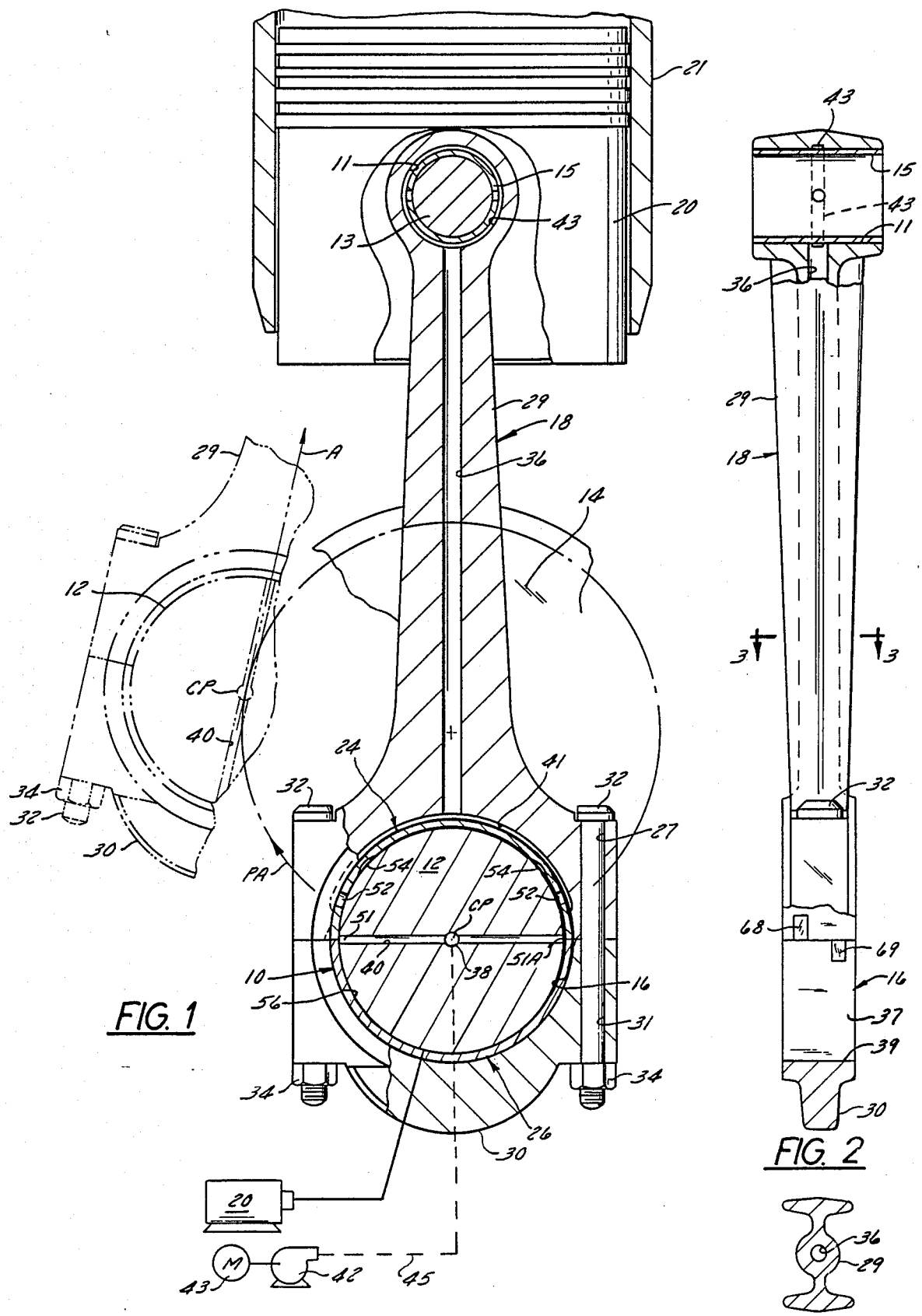
FIG. 1 is a front elevation view, partly in cross section, showing a connecting rod and bearing assembly therefor in accordance with the invention in association with a crankshaft, crank pin and piston wrist pin of a refrigeration compressor.
FIG. 2 is a side elevation view, partly in cross section, of the connecting rod and bearing assembly of FIG. 1.
FIG. 3 is a cross section view of the connecting rod taken on line 3—3 of FIG. 2.

Referring to FIG. 1, there is shown a portion of a machine, such as a reciprocating type gas compressor or the like including a rotatable crankshaft 14, a piston 20, reciprocably movable in a cylinder 21, and a connecting rod 18 connected between the crankshaft and piston to transmit motion therebetween.

Crankshaft 14 has a cylindrical crank pin 12 thereon. Piston 20 has a cylindrical wrist pin 13 therein. Connecting rod 18 has a cylindrical wrist pin hole 11 at its upper end for receiving wrist pin 13 and a cylindrical bearing or bushing 15 therearound. Connecting rod 18 also has a cylindrical crank pin hole 16 at its lower end for receiving crank pin 12. An anti-friction bearing assembly 10 is disposed in hole 16 around crank pin 12 and generally comprises an upper section 24 and a lower section 26.

Crankshaft 14 is rotatably driven by an electric motor 20. Crankshaft 14 can be driven for rotation in either direction, depending on the compressor installation, but is shown herein (in FIGS. 1 and 17) as being driven so that the centerpoint CP of the crank pin 12 thereon traces a clockwise (in FIGS. 1 and 17) circular path PA to impart reciprocating vertical motion to connecting rod 18 and piston 20. On each upstroke or compression stroke in the direction of Arrow A, piston 20 effects compression and eventual exhausting of refrigerant gas out of cylinder 21. On each downstroke (Arrow B in FIG. 17), piston 20 draws uncompressed gas into cylinder 21. Thus, on each upstroke, piston 20 is working against a relatively large load and the upper side of crank pin 12 exerts a relatively large force toward the upper section 24 of bearing assembly 10 and toward the upper side wall of the crank pin hole 16. This force is substantially greater than that exerted by the lower side of crank pin 12 toward the lower section 26 of bearing assembly 10 and the lower side wall of crank pin hole 16 during a return or suction stroke of piston 20. A pump 42 driven by an electric motor 43 is provided to supply lubricating oil through an oil supply line 45 to lubricate bearing assembly 10 and wrist pin bearing 15, as hereinafter explained.

Figure 6:
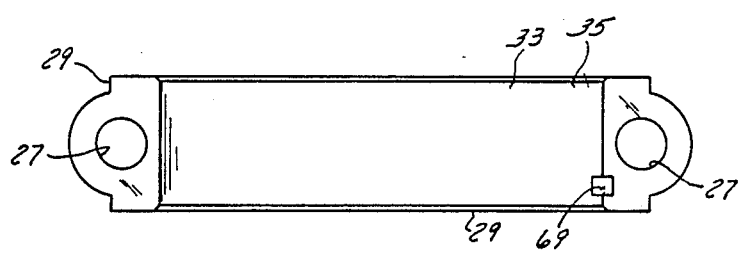
FIG. 6 is an elevation view taken on parting line 6—6 of FIG. 4 and showing the inside wall of the semi-circular opening at the lower end of the elongated section of the connection rod.

As FIGS. 1, 2, 3, 4, 5 and 6 show, connecting rod 18 comprises an elongated main portion 29 and an end cap portion 30 which is secured to main portion 29 by a pair of bolts 32, each of which is provided with a nut 34. Each bolt 32 extends through aligned holes 27 and 31 in flanges formed on connecting rod portions 29 and 30, respectively. Main portion 29 of connecting rod 18 is provided at its lower end with a semi-circular recess 33 defined by a wall 35. Cap portion 30 is provided at its lower end with a semi-circular recess 37 defined by a wall 39. When main portion 29 and cap portion 30 of connecting rod 18 are assembled, the semi-circular recesses 33 and 37 cooperate to define cylindrical crank pin receiving hole 16. As FIG. 6 shows, wall 35 of main portion 29 of connecting rod 18 is provided with an oil receiving groove or recess 41 which extends therealong intermediate the opposite ends of wall 35. The wall defining wrist pin hole 11 in connecting rod 18 is provided with an oil groove 43 which extends circumferentially therearound. Main portion 29 of connecting rod 18 is provided with an oil passage 36 which extends therethrough and communicates between the oil receiving groove 41, and the oil groove 43 in wrist pin hole 11.

Figure 7:
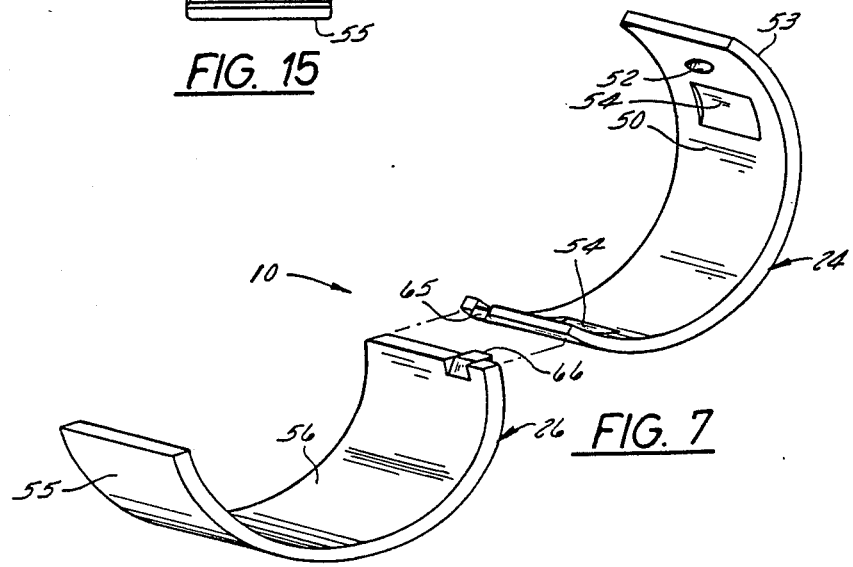
FIG. 7 is a perspective view of the upper and lower bearing sections of the bearing assembly of FIGS. 1, 2 and 4.

The walls 35 and 39 of the semi-circular recesses 33 and 37 of the main portion 29 and end cap portion 30, respectively, of connecting rod 18 are provided with notches or recesses 68 and 69, respectively, which engage tabs 65 and 66 (see FIG. 7), respectively, on the bearing sections 24 and 26, respectively, to hold them in place.

Figure 4:
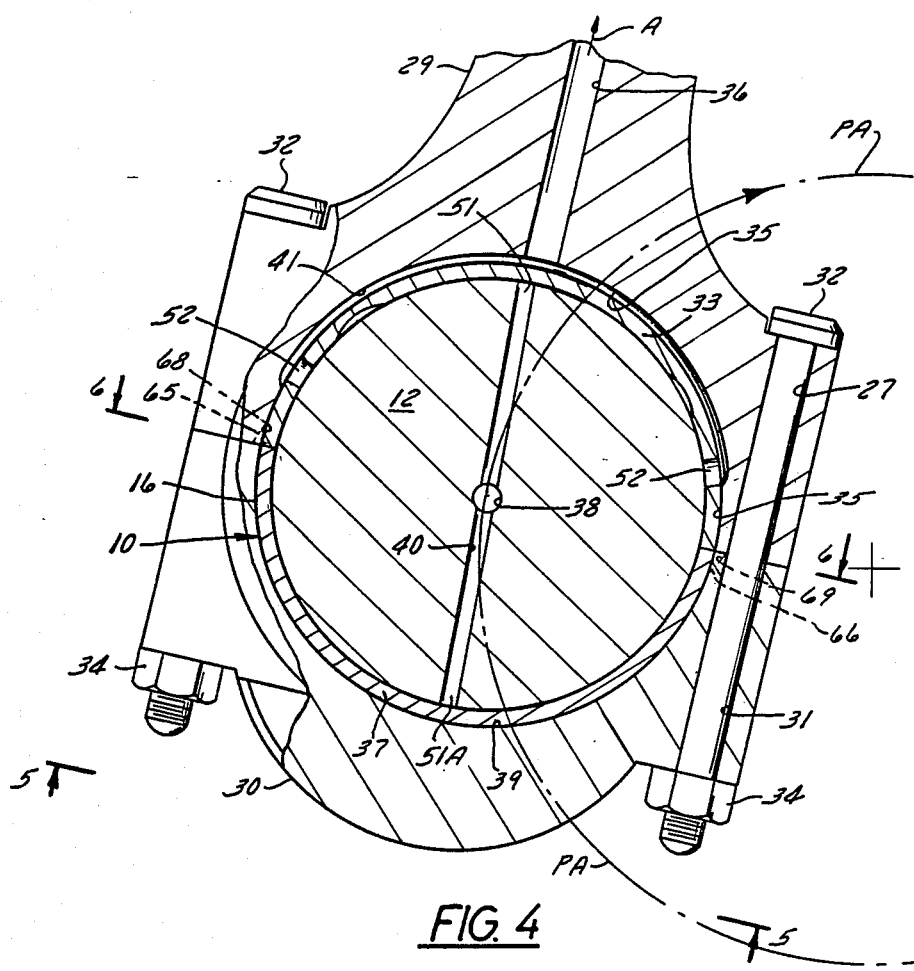
FIG. 4 is a view similar to FIG. 1 but showing the crankshaft, crank pin, connecting rod and bearing assembly in another position.
Figure 5:
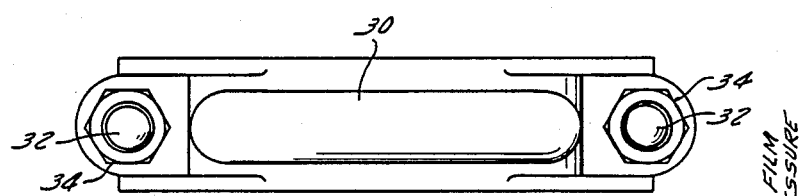
FIG. 5 is an elevation view of the end cap at the lower end of the connecting rod of FIGS. 1, 2 and 4.
Figure 17:
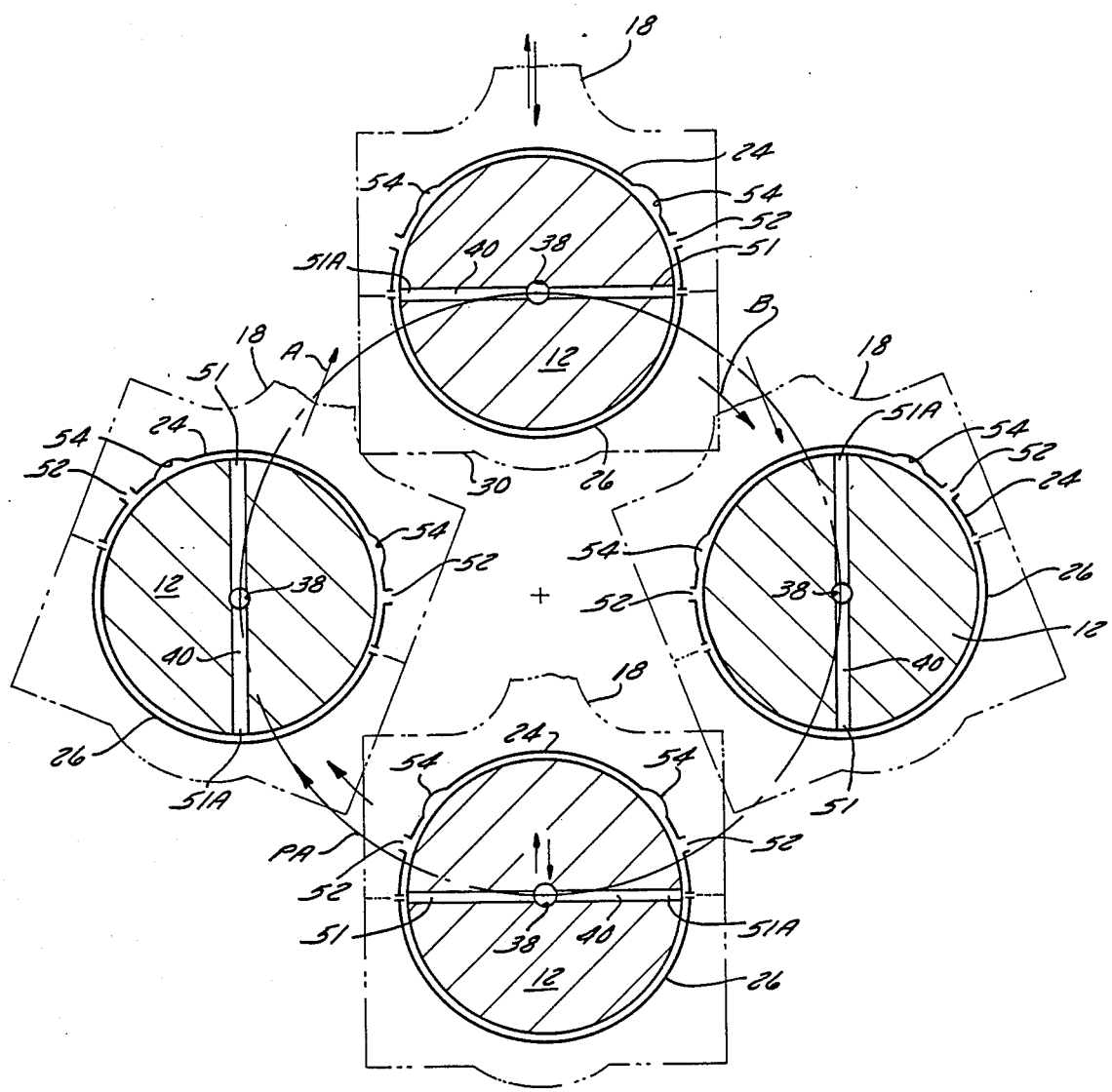
FIG. 17 is a schematic diagram depiction one cycle of rotation of the crankshaft.

As FIGS. 1, 4 and 17 show, crank pin 12 of crankshaft 14 is provided with an oil supply passage 38 which extends axially therethrough along the centerline CP thereof. As will be understood, one end (not shown) of passage 38 is closed and the other end is connected to oil supply line 45 from oil pump 42. Crank pin 12 is also provided with an oil feed passage 40 which extends transversely therethrough and has outlet ports 51 and 51A at opposite ends thereof which open on opposite sides of the surfaces of crank pin 12. Oil feed passage 40 communicates with and is supplied by oil supply passage 38.

As FIGS. 7, 10, 11, 12 and 13 show, upper bearing section 24 is generally semi-circular or semi-cylindrical in configuration and comprises a smooth semi cylindrical inner bearing surface 50 and a smooth outer surface 53. Section 24 also comprises a pair of oil holes 52 which extend therethrough and a pair of depressions or recesses near opposite ends of inner surface 50 defining two oil wells 54 adjacent the holes 52. Two oil wells 54 are provided and both will exhibit hydrodynamic lubrication regardless of the direction of rotation of crank pin 12.

As FIGS. 7, 14, 15 and 16 show, lower bearing section 26 is generally semi-circular or semi-cylindrical in configuration and comprises a smooth inner bearing surface 56 and a smooth outer surface 55.

Figure 16:
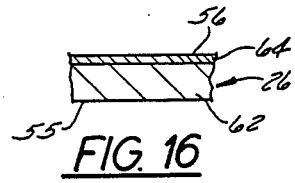
FIG. 16 is a cross section view taken on line 16—16 of FIG. 15.

Preferably, as FIG. 16 shows, lower bearing section 26 is fabricated of a steel backing portion 62 to which a tin base rabbit metal face 64 is bonded to serve as a bearing surface. Upper bearing section 24 is understood to be similarly constructed.

The bearing sections 24 and 26 are provided at one end with outwardly bent integrally formed tabs 65 and 66, respectively, which serve to engage the notches 68 and 69, respectively, in the walls of opening 16 and prevent rotation of the bearing sections relative to the connecting rod 18.

Figure 12:
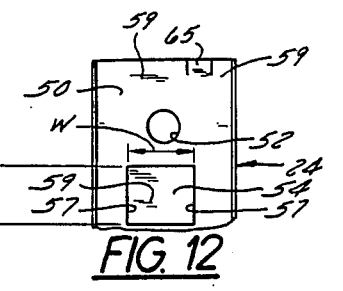
FIG. 12 is an elevation view taken in line 12—12 of FIG. 10 and showing an oil well recess.
Figure 13:
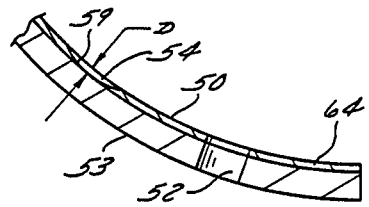
FIG. 13 is an enlarged cross section view taken in line 13—13 of FIG. 11 and showing the configuration of the oil well recess.
Figure 14:
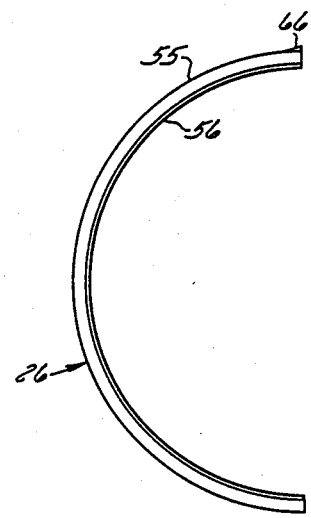
FIG. 14 is an elevation view of one edge of the lower bearing section.
Figure 15:
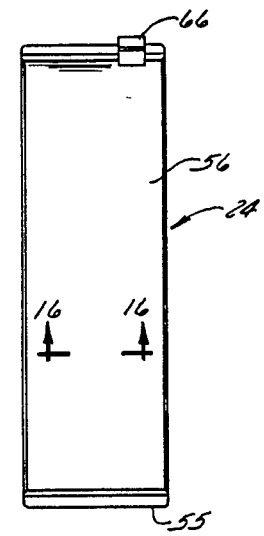
FIG. 15 is an elevation view of the smooth uninterrupted inside surface of the lower bearing section.

As FIGS. 7, 10, 11, 12 and 13 best show, each oil well recess 54 in upper bearing section 24 is arcuate or curved when viewed in cross-section and is tapered or wedge-shaped near its opposite ends. More specifically, each oil well recess 54, which extends inwardly from the semi-cylindrical inner bearing surface 50 of upper bearing section 24, has a cross-sectional configuration, taken lengthwise of upper bearing section 24, which is arcuate or curved. Each well is easily formed by grinding or milling with a circular tool. Each recess 54 is defined by a pair of laterally spaced apart side wall surfaces 57 and an arcuately curved bottom wall surface 59. Recess 54 is closed at both ends thereof when associated with cylindrical crank pin 12 and diminishes in depth proceeding in a direction from its center toward its opposite ends so that the closed recess 54 is tapered or wedge-shaped at its opposite ends when viewed in longitudinal cross-section. For convenience in discussion and as FIGS. 12 and 13 show, recess 54 has a predetermined width W (FIG. 12), a predetermined length L (FIG. 12), and a predetermined depth D (FIG. 13) which diminishes as above-mentioned. Preferably, the width W of recess 54 should be as great as is practical relative to the width of bearing section 24. Each oil hole 52 is spaced from its associated oil well recess 54 and is located between the oil well recess and an end of the upper bearing section 24. The space on surface 50 between the two oil well recesses 54 is a principal load-bearing surface or zone which engages the load-bearing surface of crank pin 12.

Operation of the system is as follows. Assume that the components thus far described are arranged as shown in FIG. 1, and that they are in motion but momentarily at the extreme bottom of a downstroke as shown in FIGS. 1 and 17. Oil is being supplied axial oil supply passage 38 and through transverse oil feed passage 40 in crank pin 12 to the ports 51 and 51A. Oil flows from each port 51 and 51A directly into its associated oil well recess 54 as it moves there past and from there it flows directly from the narrow end of oil well recess 54 into the space between the smooth inner surface 50 (the load bearing zone) of upper bearing section 24 and the confronting surface of crank pin 12 as a result of hydrodynamic lubrication, as hereinafter described. Oil also flows to the space between the smooth inner surface 56 and lower bearing section 26 and the surface of crank pin 12. Oil also flows directly from each port 51 and 51A through the associated oil hole 52 in upper bearing section 24 as it moves therepast into an end of the oil receiving groove 41 formed in wall 35 of crank pin hole 16 of connecting rod 18. From groove 41 oil flows through passage 36 in rod 18 to oil receiving groove 43 in writ pin hole 11 and from thence to the space between wrist pin bearing 15 and the surface of wrist pin 13.

Referring to FIGS. 1, 4 and 17, as crankshaft 14 rotates and crank pin 12 proceeds along path PA on a compression stroke, the bearing assembly 10 retains its original position relative to the connecting rod 18. However, half-way through the compression stroke (as shown in phantom view in FIG. 1 and in FIGS. 4 and 17), crank pin 12 has rotated (clockwise in FIGS. 1 and 17) more than 90° relative to the bearing assembly 10 and the oil port 51 at one end of crank pin oil passage 40 passes an oil hole 52 and an oil well recess 54.

As will be understood, at the top of the compression stroke, crank pin 12 will have rotated 180° relative to bearing assembly 10 and the oil port 51 will have passed both wells and holes (and the ports 51 and 51A will have reversed position). As will be further understood, in proceeding from the top of the compression stroke to the position shown in FIG. 1, the components will effect an intake stroke and crank pin 12 (and its oil ports 51) will return to the original position shown in Fig. 1 in solid lines. During the intake stroke, port 51 will supply oil to the other well 54 and hole 52.

As crank pin 12 proceeds from the original position shown in FIG. 1 to the top of the compression stroke the following phenomena occur. First, crank pin 12 exerts a gradually increasing force against the oil present in the space between the surface of crank pin 12 and the load-bearing zone on inner surface 50 of upper bearing section 24. It is to be understood that there is no direct metal-to-metal contacts between crank pin 12 and upper bearing section 24 because of the presence of oil. Second, as the force increases there is also relative motion between the outer surface of crank pin 12 (which is moving clockwise in FIG. 1) and the inner surface 50 of upper bearing section 24. As a result of this combination of pressure and motion, hydrodynamic lubrication occurs at the right end of the oil well recess 54 shown at the left side of FIG. 1. Because of motion in this direction, hydrodynamic lubrication also occurs at the right end of the oil well recess 54 shown at the right side of FIG. 1.

As previously explained, during hydrodynamic lubrication, lubricant adheres to both the relatively stationary surface 50 and moving (rotating) surface of crank pin 12 and is dragged or drawn by molecular friction between the oil and moving crank pin surface into the rapidly narrowing clearance space in the right end of oil well recess 54 in the direction of motion, where it builds up a fluid pressure sufficient to carry the load.

Hydrodynamic lubrication is achieved by shaping the oil well recess 54 (at the left side of FIG. 1) so that it has an arcuate cross-sectional configuration lengthwise (previously described) which diminishes in depth at opposite ends to form a converging wedge at each end. Lubricating oil, because of its molecular structure, exhibits "viscous drag" when it flows. Thus, oil is literally drawn into the converging wedge at the right end of the well from the oil well recess 54 and is dragged by the rotating shaft into the load-bearing zone of the bearing by "viscous drag", building up a pressure film with tremendous carrying power. Each oil well recess 54 is preferably almost as wide as the bearing section 24 to ensure that sufficient oil enters the load-bearing zone and that it is spread evenly. Hydrodynamic lubrication is required because, as previously mentioned, the oil is supplied at a pressure of only about 40 psi to each oil well recess and this is insufficient to overcome the squeezing force of about 1000 psi that occurs between the upper bearing section 24 and the crank pin 12 during a compression stroke.

As will be understood, the oil in the right side oil well recess 54 is supplied and distributed as hereinbefore described. Oil in each oil well recess 54 is replenished periodically each time end port 51 or 51A of oil feed passage 40 moves therepast. Thus, an ample supply of oil is always available to lubricate the bearing and crank pin 12.

Unlike generally similar bearing assemblies used in four-cycle high-temperature internal combustion engines, the subject bearing assembly 10 is used in a relatively cool (300°) two-cycle refrigerator compressor and, therefore, the upper bearing half 24 is always subjected to a heavy compressive load on every upstroke (i.e. compression stroke). The heavily loaded smooth uninterrupted upper bearing surface 50 prevents formation of a wear groove in the surface of crank pin 12. The wells 54 on upper half 24 enable use of heavier grade oil (300 viscosity) at higher pressure for "hydrodynamic lubrication".

Figure 9:
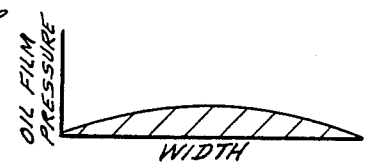
FIG. 9 is a graph or diagram showing the oil film pressure plotted against bearing width on a crank pin by a lower bearing section having no groove on its inner surface.
Figure 8:
FIG. 8 is a graph or diagram showing the oil film pressure plotted against bearing width on a crank pin during a compression stroke by an upper bearing section having no groove on its inner surface.
Figure 10:
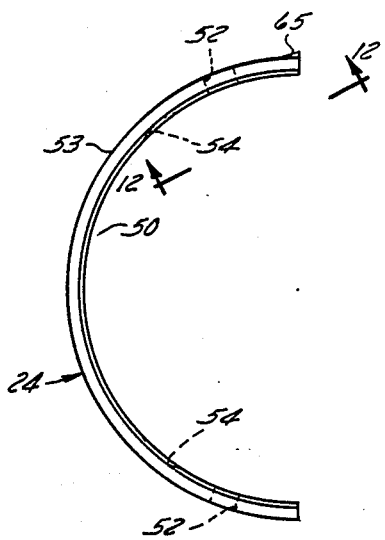
FIG. 10 is an elevation view of one edge of the upper bearing section.
Figure 11:
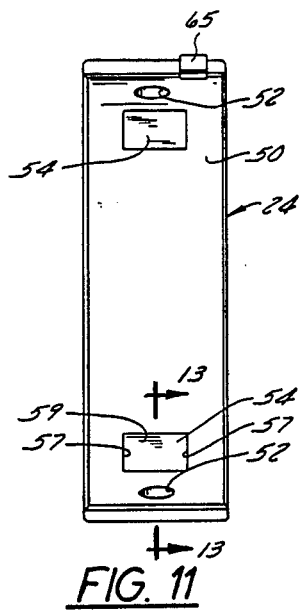
FIG. 11 is an elevation view of the inside surface of the upper bearing section.

FIGS. 8 and 9 show the force distribution and wear pattern on crank pin 12 when using ungrooved upper and lower bearing sections 24 and 26 and lubrication system in accordance with the present invention. The cross sectional area in FIGS. 8 and 9 is indicative of the load carrying capacity of the bearing.

I claim:
1. In combination:
 a connecting rod (18), a crankshaft (14) and bearing means (10);
 said connecting rod (18) comprising a wrist pin hole (11), a crank pin hole (16) having opposite side walls (35, 39) and having a circumferentially extending oil groove (41) formed in one side wall (35) of said crank pin hole (16) closest to said wrist pin hole (11), and an oil passage (36) communicating between said oil groove (41) and said wrist pin hole (11);
 said crankshaft (14) comprising a crank pin (12) disposed in said crank pin hole (16) and having at least one oil supply port (51, 51A) located on the outer surface of said crank pin (12);
 said bearing means (10) disposed in said crank pin hole (16) around said crank pin (12) and comprising two discrete separable bearing sections (24, 26), each bearing section (24, 26) having an inner surface, an outer surface and opposite ends;

said oil supply port (51, 51A) being adapted to constantly supply oil directly to the inner surfaces of the bearing sections (24, 26);

at least one of said bearing sections (24, 26) having a projection (65, 66) at one end thereof which is engaged with a notch (68, 69) formed in a side wall of said crank pin hole (16) to prevent rotation of said bearing sections (24, 26) relative to said crank pin hole (16);

one bearing section (26) disposed between said crank pin (12) and the side wall (39) of said crank pin hole (16) which is opposite said one side wall (35), said one bearing section (26) having an uninterrupted smooth outer surface (55) confronting said opposite side wall (39) of said crank pin hole (16) and having an uninterrupted smooth inner surface (56) confronting said crank pin (12);

the other bearing section (24) disposed between said crank pin (12) and said one side wall (35) of said crank pin hole (16), said other bearing section (24) having an uninterrupted smooth outer surface (53) confronting said oil groove (41) in said one side wall (35) of said crank pin hole (16), said other bearing section (24) having a smooth inner surface (50) confronting said crank pin (12);

said other bearing section (24) being provided near each end with an oil feed hole (52) spaced inwardly from a respective end and extending from said inner surface (50) to said outer surface (53) into direct communication with said oil groove (41) for enabling periodic oil flow from said oil supply port (51, 51A) through the oil feed holes (52), through said oil groove (41) and through said oil passage (36) to said wrist pin hole (11);

said other bearing section (24) being provided near each end with an oil well recess (54) spaced inwardly and spaced from a respective oil feed hole (52) for periodically receiving oil directly from said oil supply port (51, 51A) and operable in cooperation with said crank pin (12) and said inner surface (50) of said other bearing section (24) to provide hydrodynamic lubrication of said bearing means (10) and said crank pin (12);

said oil well recess (54) having spaced apart side walls (57) and a curved rear wall (59) cooperating with said outer surface of said crank pin (12) to define an oil well recess (54) having a curved longitudinal cross-sectional configuration having a wedge-shaped cross-sectional configuration at each end thereof adjacent a zone between said inner surface (50) of said other bearing section (24) and said outer surface of said crank pin (12), said crank pin (12) being movable during rotational movement of said crankshaft (14) and reciprocating movement of said connecting rod (18) to cause said oil supply port (51, 51A) to periodically move past and directly supply oil to each of said oil feed holes (52) and to each of said oil well recesses (54) and to cause oil present in said oil well recesses (54) to be drawn from an end thereof by hydrodynamic lubrication and to be forced between said inner surface (50) of said other bearing section (24) and said outer surface of said crank pin (12).

2. A combination according to claim 1 wherein said crank pin has two oil supply ports located on opposite sides of said crank pin.

3. In combination:

bearing means (10) for disposition in a crank pin hole (16) in a connecting rod (18) around a crank pin (12) having an oil supply port (51, 51A) located on the outer surface thereof, said crank pin hole (16) having a circumferentially extending oil groove (41) formed in the side wall thereof;

said bearing means (10) comprising two discrete separate bearing section (24, 26), each bearing section (24, 26) having a an inner surface, an outer surface and opposite ends;

at least one of said bearing sections (24, 26) having a projection (65, 66) at one end thereof which is engageable with a notch (68, 69) in said crank pin hole (16) to prevent rotation of said bearing sections (24, 26) relative to said crank pin hole (16);

one bearing section (26) having an uninterrupted smooth outer surface (55) and having an uninterrupted smooth inner surface (56);

the other bearing section (24) having an uninterrupted smooth outer surface (53) for confronting said oil groove (41) and having a smooth inner surface (50);

said other bearing section (24) being further provided near each end with an oil feed hole (52) spaced inwardly from a respective end and extending from said inner surface (50) to said outer surface (53) into direct communication with said oil groove (41) for enabling periodic oil flow from said oil supply port (51, 51A), through the oil feed holes (52) to said oil groove (41);

said other bearing section (24) being provided near each end with an oil well recess (54) spaced inwardly and spaced from a respective oil feed hole (52) for periodically receiving oil from said oil supply port (51, 51A) and operable in cooperation with said crank pin (12) to expel oil therefrom along said outer surface of said crank pin (12) and said inner surface (50) of said other bearing section (24) to provide hydrodynamic lubrication of said bearing means (10) and said crank pin; (12);

said oil well recess (54) having spaced apart side walls (57) and a curved rear wall (59) cooperable with said outer surface of said crank pin (12) to define an oil well recess (54) having a curved longitudinal cross-sectional configuration having a wedge-shaped cross-sectional configuration at each end thereof.

* * * * *